United States Patent
Kwon et al.

(10) Patent No.: US 9,000,695 B2
(45) Date of Patent: Apr. 7, 2015

(54) SENSORLESS CONTROL APPARATUSES AND CONTROL METHODS THEREOF

(71) Applicant: Samsung Electronics Co., Ltd., Suwon-Si, Gyeonggi-Do (KR)

(72) Inventors: Oh Hyuk Kwon, Suwon-si (KR); Young Doo Yoon, Seoul (KR); Ho Sun Yoo, Seongnam-si (KR); So Hee Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 194 days.

(21) Appl. No.: 13/846,112

(22) Filed: Mar. 18, 2013

(65) Prior Publication Data

US 2013/0249450 A1    Sep. 26, 2013

(30) Foreign Application Priority Data

Mar. 20, 2012    (KR) .................. 10-2012-0028087

(51) Int. Cl.
  *H02P 6/08*    (2006.01)
  *H02P 6/18*    (2006.01)
  *H02P 21/00*   (2006.01)

(52) U.S. Cl.
  CPC .............. *H02P 21/0039* (2013.01); *H02P 6/08* (2013.01); *H02P 6/18* (2013.01); *H02P 6/182* (2013.01)

(58) Field of Classification Search
  USPC .................. 318/400.02, 400.21, 701, 721
  See application file for complete search history.

(56) References Cited

U.S. PATENT DOCUMENTS

| | | | | |
|---|---|---|---|---|
| 5,952,810 A | * | 9/1999 | Yamada et al. | 318/700 |
| 5,969,496 A | * | 10/1999 | Yamada et al. | 318/715 |
| 6,025,692 A | * | 2/2000 | Yamada et al. | 318/721 |
| 6,037,741 A | * | 3/2000 | Yamada et al. | 318/721 |
| 6,051,946 A | * | 4/2000 | Yamada et al. | 318/432 |
| 6,515,446 B1 | * | 2/2003 | Koide et al. | 318/700 |
| 2001/0007416 A1 | * | 7/2001 | Koide et al. | 318/701 |
| 2004/0249596 A1 | * | 12/2004 | Ho | 702/106 |
| 2006/0076911 A1 | * | 4/2006 | Kuroshima et al. | 318/254 |
| 2009/0237015 A1 | * | 9/2009 | Hashimoto et al. | 318/400.02 |

* cited by examiner

*Primary Examiner* — Paul Ip
(74) *Attorney, Agent, or Firm* — Harness, Dickey & Pierce, PLC

(57) ABSTRACT

A sensorless control apparatus may include: a speed command unit configured to output a speed command to an electric motor; a current detector unit configured to detect electric current flowing through the electric motor if a voltage being output according to the speed command is supplied to the electric motor; a rotor angle calculation unit configured to calculate a magnetic flux of a rotor of the electric motor based on the detected electric current and the voltage being output according to the speed command, and to calculate an angle of the rotor from the calculated magnetic flux; and/or an out-of-step sensing unit configured to sense an out-of-step of the rotor according to a comparison of the calculated angle of the rotor with an angle of the rotor estimated based on a sensorless control algorithm.

20 Claims, 7 Drawing Sheets

SENSORLESS CONTROL APPARATUSES AND CONTROL METHODS THEREOF

CROSS-REFERENCE TO RELATED APPLICATION(S)

This application claims priority from Korean Patent Application No. 10-2012-0028087, filed on Mar. 20, 2012, in the Korean Intellectual Property Office (KIPO), the entire contents of which are incorporated herein by reference.

BACKGROUND

1. Field

Some example embodiments of the present disclosure may relate to sensorless control apparatuses and/or control methods thereof. Some example embodiments may relate to sensorless control apparatuses capable of sensing rotors being out of orientation in sensorless controls of electric motors and/or a control methods thereof.

2. Description of Related Art

An electric motor is an apparatus configured to convert electric energy into mechanical energy by use of a force applied to a conductor with flowing electric current in a magnetic field. The electric motor may be a direct current motor or an alternating current motor depending on the type of power being used. The alternating current motor may be a one phase alternating motor or a three phase alternating motor. Each alternating current motor may be an induction-type motor or a synchronous-type motor.

The synchronous motor may be supplied with a magnetic flux from a permanent magnet attached on a rotor and, at all times, precise position information of the rotor may be needed to perform vector control. In order to obtain the position information of the rotor, a position detection sensor, such as a resolver or an encoder, may need to be attached to a shaft of the motor. However, the position detection sensor is expensive, and requires additional complicated hardware. In addition, having the position detection sensor mounted on the shaft of the motor increases the size of the motor and the weight of the motor.

In order to remove the constraints as such, a large amount of research has been conducted on sensorless control. Sensorless control refers to a control scheme to obtain the position of a rotor in an indirect manner without using a position detection sensor.

Since the sensorless control does not have a position detection sensor, an occurrence of being out of orientation is difficult to sense. If electric current is continuously supplied to a motor for a control operation in a state of being out-of-orientation, the motor may break down due to excessive current.

The conventional sensorless control may use an out-of-step detection scheme in which a speed command is provided to a motor and, after a predetermined period of time, if the motor fails to reach to a target speed, the motor is determined to be out-of-orientation. However, the out-of-step detection as such is not suitable for a case having a variable load torque or a case that does not require precise speed control. In addition, even if the rotor does not rotate in practice, a sensorless algorithm may have abnormal operation that erroneously estimates the rotor as being rotated.

SUMMARY

Example embodiments of the present disclosure may provide sensorless control apparatuses capable of sensing rotors being out of orientation in sensorless controls of synchronous motors and/or control methods thereof.

In some example embodiments, a sensorless control method may comprise: outputting a speed command that is to be provided to an electric motor; detecting electric current flowing through the electric motor if a voltage being output according to the speed command is supplied to the electric motor; calculating a magnetic flux of a rotor of the electric motor based on the detected electric current and the voltage being output according to the speed command; calculating an angle of the rotor from the calculated magnetic flux; and/or sensing an out-of-step of the rotor according to a result of comparison between the calculated angle of the rotor and an angle of the rotor estimated based on a sensorless control algorithm.

In some example embodiments, the detecting of the electric current may comprise: detecting three-phase current being supplied to the electric motor; converting the detected three-phase current into two-phase current; and/or converting the two-phase current in a stationary coordinate system of the electric motor into a two-phase current in a synchronous rotation coordinate system of the electric motor.

In some example embodiments, the calculating of the magnetic flux of the rotor may comprise: calculating the magnetic flux of the rotor by use of a voltage equation on the two-phase current in the stationary coordinate system of the electric motor.

In some example embodiments, the calculating of the angle of the rotor from the calculated magnetic flux may comprise: calculating the angle of the rotor by use of a d-axis magnetic flux and a q-axis magnetic flux on the stationary coordinate system of the electric motor.

In some example embodiments, the sensing of the out-of-step of the rotor may comprise: determining that the rotor rotates in a normal state, if a difference between the calculated angle of the rotor and the estimated angle of the rotor maintains a constant value; and/or determining that the rotor is in an out-of-step state, if the difference between the calculated angle of the rotor and the estimated angle of the rotor varies over time.

In some example embodiments, a sensorless control method may further comprise controlling the electric motor according to a result of the out-of-step sensed.

In some example embodiments, a sensorless control apparatus may comprise: a speed command unit configured to output a speed command to an electric motor; a current detector unit configured to detect electric current flowing through the electric motor if a voltage being output according to the speed command is supplied to the electric motor; a rotor angle calculation unit configured to calculate a magnetic flux of a rotor of the electric motor based on the detected electric current and the voltage being output according to the speed command, and to calculate an angle of the rotor from the calculated magnetic flux; and/or an out-of-step sensing unit configured to sense an out-of-step of the rotor according to a comparison of the calculated angle of the rotor with an angle of the rotor estimated based on a sensorless control algorithm.

In some example embodiments, the sensorless control apparatus may further comprise a first converter configured to convert calculated two-phase voltage commands, corresponding to the speed command, into three-phase voltages, corresponding to the speed command.

In some example embodiments, the sensorless control apparatus may further comprise a first coordinate system conversion unit configured to convert calculated magnetic flux and torque commands, corresponding to the speed command, on a synchronous rotation coordinate system of the electric motor into calculated magnetic flux and torque commands, corresponding to the speed command, on a stationary coordinate system of the electric motor.

In some example embodiments, the sensorless control apparatus may further comprise a second coordinate system conversion unit configured to convert calculated magnetic flux and torque commands, corresponding to the speed command, on a stationary coordinate system of the electric motor into voltages, corresponding to the speed command, on the stationary coordinate system of the electric motor.

In some example embodiments, the sensorless control apparatus may further comprise a first coordinate system conversion unit configured to convert calculated magnetic flux and torque commands, corresponding to the speed command, on a synchronous rotation coordinate system of the electric motor into calculated magnetic flux and torque commands, corresponding to the speed command, on a stationary coordinate system of the electric motor; and/or a second coordinate system conversion unit configured to convert the calculated magnetic flux and torque commands, corresponding to the speed command, on the stationary coordinate system of the electric motor into voltages, corresponding to the speed command, on the stationary coordinate system of the electric motor.

In some example embodiments, the sensorless control apparatus may further comprise a second converter configured to convert three-phase currents detected in coils of the electric motor into two-phase currents corresponding to the three-phase currents.

In some example embodiments, the sensorless control apparatus may further comprise a third coordinate system conversion unit configured to convert currents detected in coils of the electric motor into currents in a stationary coordinate system of the electric motor, corresponding to the currents detected in the coils of the electric motor.

In some example embodiments, the sensorless control apparatus may further comprise a fourth coordinate system conversion unit configured to convert currents in a stationary coordinate system of the electric motor, corresponding to currents detected in coils of the electric motor, into currents in a synchronous rotation coordinate system of the electric motor, corresponding to the currents detected in the coils of the electric motor.

In some example embodiments, the sensorless control apparatus may further comprise a third coordinate system conversion unit configured to convert currents detected in coils of the electric motor into currents in a stationary coordinate system of the electric motor, corresponding to the currents detected in the coils of the electric motor; and/or a fourth coordinate system conversion unit configured to convert the currents in the stationary coordinate system of the electric motor, corresponding to the currents detected in coils of the electric motor, into currents in a synchronous rotation coordinate system of the electric motor, corresponding to the currents detected in the coils of the electric motor.

In some example embodiments, the rotor angle calculation unit may be configured to calculate the magnetic flux of the rotor by use of a voltage equation on a stationary coordinate system of the electric motor.

In some example embodiments, the rotor angle calculation unit may be configured to calculate the angle of the rotor by use of a d-axis magnetic flux and a q-axis magnetic flux on a stationary coordinate system of the electric motor.

In some example embodiments, the out-of-step sensing unit may be configured to determine that the rotor rotates in a normal state, if a difference between the calculated angle of the rotor and the estimated angle of the rotor maintains a constant value over time. The out-of-step sensing unit may be configured to determine that the rotor is in an out-of-step state, if the difference between the calculated angle of the rotor and the estimated angle of the rotor varies over time.

In some example embodiments, the speed command unit may be configured to control the electric motor according to a result of the sensing by the out-of-step sensing unit.

In some example embodiments, the sensorless control apparatus may further comprise a rotor angle estimation unit configured to estimate the angle of the rotor based on the sensorless control algorithm. The out-of-step sensing unit may be configured to sense the out-of-step of the rotor according to a result of comparison between the calculated angle of the rotor from the rotor angle calculation unit and the estimated angle of the rotor from the rotor angle estimation unit.

In some example embodiments, an output of the out-of-step sensing unit may be used as an input to the speed command unit.

In some example embodiments, if the out-of-step sensing unit senses the out-of-step of the rotor, the speed command unit may be configured to stop operation of the electric motor.

In some example embodiments, if the out-of-step sensing unit senses the out-of-step of the rotor, the speed command unit may be configured to decelerate the electric motor.

In some example embodiments, a sensorless control apparatus may comprise: a speed command unit configured to output speed commands; a speed control unit configured to output current commands that correspond to the speed commands; a current control unit configured to output voltage commands that correspond to the current commands; a converter configured to output three-phase voltages that correspond to the voltage commands; a modulation unit configured to output a modulated signal, based on the three-phase voltages, to an inverter associated with an electric motor; a rotor angle calculation unit configured to calculate an angle of a rotor of the electric motor; a rotor angle estimation unit configured to estimate the angle of the rotor of the electric motor based on a sensorless control algorithm; and an out-of-step sensing unit configured to sense out-of-step of the rotor of the electric motor according to a comparison of the calculated angle of the rotor with the estimated angle of the rotor.

In some example embodiments, the sensorless control apparatus may further comprise a current detector unit. The current detector unit may be configured to detect electric current flowing through coils of the electric motor.

In some example embodiments, a sensorless control apparatus may comprise: a speed command unit configured to output speed commands; a speed control unit configured to receive the speed commands and to convert the speed commands into current commands; a current control unit configured to receive the current commands and to convert the current commands into voltage commands; a converter configured to receive the voltage commands and to convert the voltage commands into three-phase voltages; a modulation unit configured to receive the three-phase voltages and to output a modulated signal to an inverter associated with an electric motor; a rotor angle calculation unit configured to calculate an angle of a rotor of the electric motor; a rotor angle estimation unit configured to estimate the angle of the rotor of the electric motor based on a sensorless control algorithm; and an out-of-step sensing unit configured to sense out-ofstep of the rotor of the electric motor according to a comparison of the calculated angle of the rotor with the estimated angle of the rotor.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
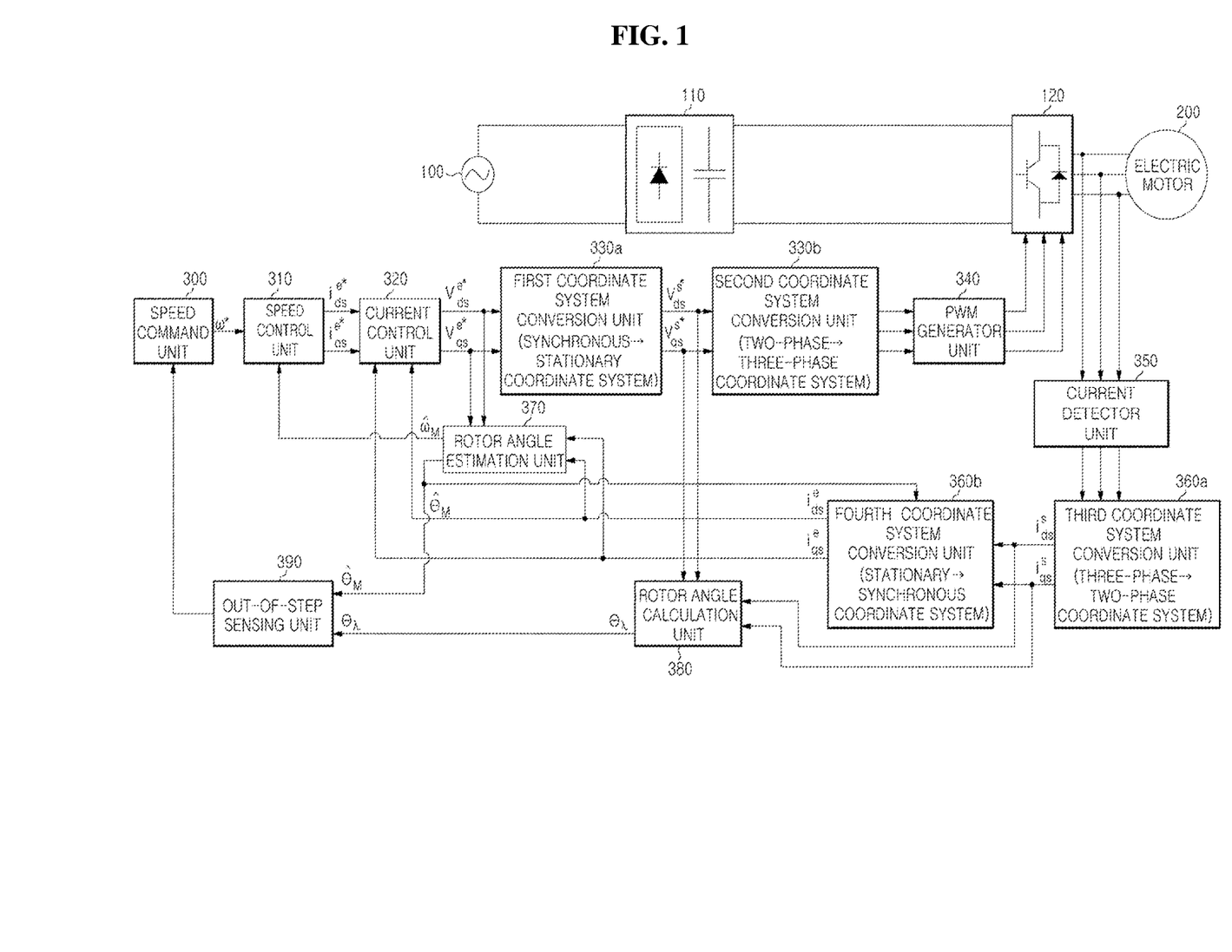
FIG. 1 is a control block diagram schematically illustrating the configuration of a sensorless control apparatus in accordance with some example embodiments of the present disclosure.

FIG. 1 is a control block diagram schematically illustrating the configuration of a sensorless control apparatus in accordance with some example embodiments of the present disclosure.

Referring to FIG. 1, the sensorless control apparatus includes a commercial power source 100, a rectifier unit 110, an inverter unit 120, an electric motor 200, a speed command unit 300, a speed control unit 310, a current control unit 320, a first coordinate system conversion unit 330a, a second coordinate system conversion unit 330b, a pulse-width modulation (PWM) generator unit 340, a current detector unit 350, a third coordinate system conversion unit 360a, a fourth coordinate system conversion unit 360b, a rotor angle estimation unit 370, a rotor angle calculation unit 380, and an out-of-step sensing unit 390.

The rectifier unit 110 converts alternating power being output from the commercial power source 100 into direct power through rectifying. For one example, the rectifier unit 110 may include four diodes (not shown) composed of a two phase bridge, and a smoothing capacitor (not shown). Through such, a full-wave rectification may be performed. For another example, the rectifier unit 110 may be provided with a voltage doubler, and through such, a half-wave rectification may be performed.

The inverter unit 120 converts a direct voltage of the soothing capacitor into a voltage having a frequency that drives the electric motor 200. The inverter unit 120 may include six switching devices (not shown) connected in the form of a three-phase bridge. The switching device is turned on/off according to a current signal being output from the PWM generator unit 340 so as to convert the voltage delivered from the rectifier unit 110 into a three-phase voltage and supply the three-phase voltage to the electric motor 200.

The speed command unit 300 outputs a speed command (ω*) that is to be supplied to the electric motor 200. The speed command (ω*) being output from the speed command unit 300 is provided to the speed control unit 310.

The speed control unit 310 receives the speed command from the speed command unit 300, and calculates a magnetic flux current command ($i_{ds}^{e*}$) and a torque current command ($i_{qs}^{e*}$) on a synchronous rotation coordinate system. The calculated magnetic flux current command ($i_{ds}^{e*}$) and torque current command ($i_{qs}^{e*}$) are provided to the current control unit 320.

The current control unit 320 receives the magnetic flux current command ($i_{ds}^{e*}$) and torque current command ($i_{qs}^{e*}$) from the speed control unit 310, and calculates a magnetic flux voltage command ($V_{ds}^{e*}$) and a torque voltage command ($V_{qs}^{e*}$) on the synchronous rotation coordinate system. The calculated magnetic flux voltage command ($V_{ds}^{e*}$) and torque voltage command ($V_{qs}^{e*}$) are provided to the first coordinate system conversion unit 330a.

The first coordinate system conversion unit 330a converts the magnetic flux voltage command ($V_{ds}^{e*}$) and torque voltage command ($V_{qs}^{e*}$) on the synchronous rotation coordinate system into a magnetic flux voltage command ($V_{ds}^{s*}$) and a torque voltage command ($V_{qs}^{s*}$) on a stationary coordinate system. Two-phase voltage commands being output from the first coordinate system conversion unit 330a are provided to the second coordinate system conversion unit 330b.

The second coordinate system conversion unit 330b converts the two-phase voltage commands being output from the first coordinate system conversion unit 330a into three phase voltages equivalent to the two-phase voltage commands. The three-phase voltages converted are provided to the PWM generator unit 340.

The PWM generator unit 340 outputs a pulse width modulated current signal based on the three-phase voltages received. The switching device of the inverter unit 120 is turned on/off according to the current signal being output from the PWM generator unit 340 so as to convert the voltage being received from the rectifier unit 110 into three-phase voltage and provide the three-phase voltage to the electric motor 200. Hereinafter, the electric motor 200 will be described in brief with reference to FIG. 2.

Figure 2:
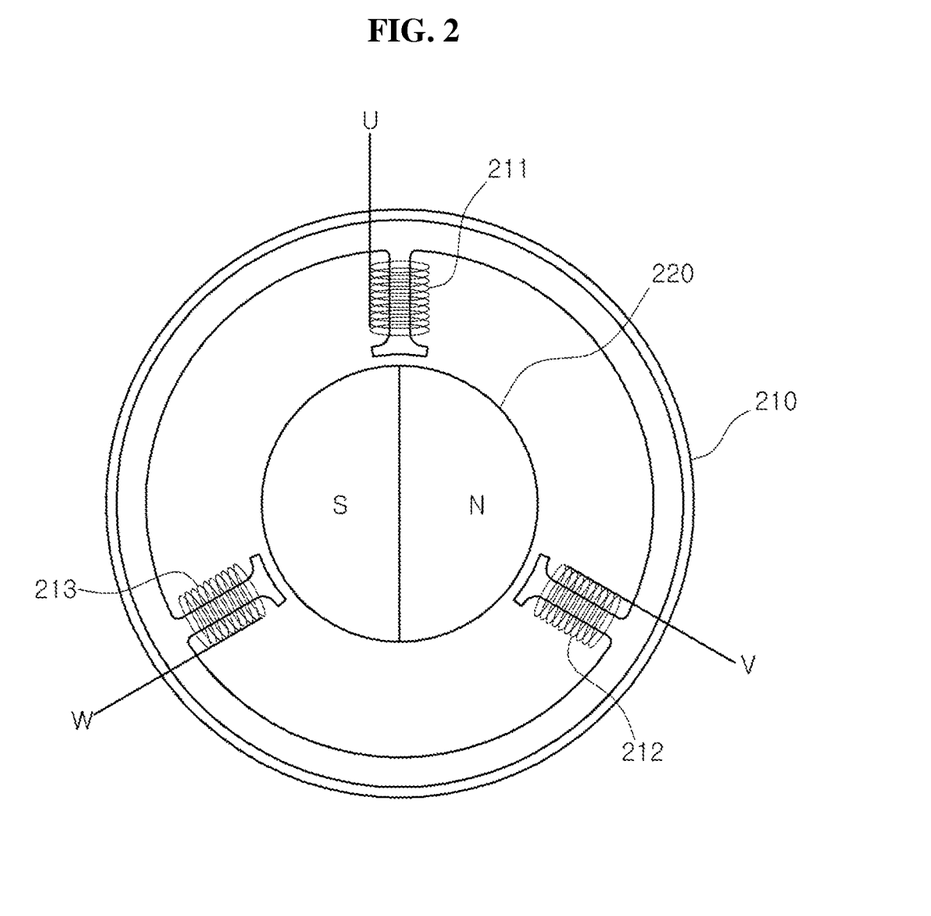
FIG. 2 is a view schematically illustrating the configuration of an electric motor shown in FIG. 1.

FIG. 2 is a view schematically illustrating the confirmation of an electric motor shown in FIG. 1.

Referring to FIG. 2, the electric motor 200 includes a stator 210 and a rotor 220. The stator 210 is provided with three coils including a U-coil 211, a V-coil 212, and a W-coil 213. The rotor 220 is formed of a permanent magnet (with north pole N and south pole S), and rotatably disposed in the stator 210. If a voltage is applied to each of the coils 211, 212, and 213, the coils 211, 212, and 213 may generate a rotating magnetic field, and the rotor 220 may be rotated by the rotating magnetic field.

Referring again to FIG. 1, the current detector unit 350 is connected between an output end of the inverter unit 120 and an input end of the electric motor 200 to detect electric current flowing to the electric motor 200. In detail, as the three-phase voltage according to the speed command being output from the speed command unit 300 is supplied to the coils 211, 212, and 213 of the electric motor 200, the current detector unit 350 detects three-phase current flowing through the respective coils 211, 212, and 213. The three-phase current being detected from the current detector unit 350 is supplied to the third coordinate system conversion unit 360a.

The third coordinate system conversion unit 360a converts the three-phase current being detected by the current detector unit 350 into two-phase current ($i_{ds}^{s}$, $i_{qs}^{s}$) equivalent to the detected three-phase current. In this case, the two-phase current and the two-phase voltage may be represented in a stationary coordinate system.

The fourth coordinate system conversion unit 360b converts the two-phase current ($i_{ds}^{s}$, $i_{qs}^{s}$) being converted from the stationary coordinate system into two-phase current ($i_{ds}^{e}$, $i_{qs}^{e}$) on the synchronous rotation coordinate system. Hereinafter, the two-phase currents $i_{ds}^{e}$ and $i_{qs}^{e}$ converted to the synchronous rotation coordinate system are referred to as 'detected current'. The conversion from the stationary coordinate system to the synchronous rotation coordinate system is generally known in the art, and the detailed description thereof will be omitted.

The rotor angle estimation unit 370 estimates a position ($\hat{\theta}_M$) of the rotor and a speed ($\hat{\omega}_M$) of the rotor based on a sensorless algorithm. The sensorless algorithm may be implemented using the Matsui algorithm.

The Matsui algorithm estimates the position ($\hat{\theta}_M$) and speed ($\hat{\omega}_M$) of the rotor based on the detected currents $i_{ds}^{e}$ and $i_{qs}^{e}$, which are received from the fourth coordinate system conversion unit 360b, and the command voltages $V_{ds}^{e*}$ and $V_{qs}^{e*}$ being received from the current control unit 320. The detected currents $i_{ds}^{e}$ and $i_{qs}^{e}$ refer to the magnetic flux current and the torque current on the synchronous rotation coordinate system, respectively. The voltages $V_{ds}^{e*}$ and $V_{qs}^{e*}$ refer to the magnetic flux voltage and the torque voltage on the synchronous rotation coordinate system, respectively. In this case, * refers to a command. In order to estimate the position ($\hat{\theta}_M$) and speed ($\hat{\omega}_M$) of the rotor, the rotor angle estimation unit 370 estimates currents $i_\gamma$ and $i_\delta$ of a present control period through a mathematical formula of the electric motor 200, based on current measured at a previous control period and a voltage being output according to a speed command at a previous control period.

The mathematical model of a general permanent magnet synchronous electric motor 200 is expressed in mathematical formula 1 below:

[Mathematical Formula 1]

$$\begin{bmatrix} V_d \\ V_q \end{bmatrix} = \begin{bmatrix} R_s + \rho L_d & -\omega L_q \\ \omega L_d & R_s + \rho L_q \end{bmatrix} \cdot \begin{bmatrix} i_d \\ i_q \end{bmatrix} + \begin{bmatrix} 0 \\ \omega \lambda_f \end{bmatrix}$$

In the mathematical formula 1, $V_d$ and $V_s$ refer to the voltage values of the d-axis and q-axis (respectively), $i_d$ and $i_s$ refer to the current values of the d-axis and q-axis (respectively), $R_s$ refers to a wiring resistance, ω refers to the speed of the rotor 220, $L_d$ refers to a d-axis inductance of the electric motor 200, $L_q$ refers to a q-axis inductance of the electric motor 200, $\lambda_f$ refers to the magnetic flux of a permanent magnet, and ρ refers to differentiation.

The position of the rotor 220 estimated by the sensorless algorithm exists at a position different from the position of the rotor on the actual synchronous rotation coordinate system, and the position of the rotor 220 estimated may be assumed as γ-δ axes. Hereinafter, the coordinate system of the rotor 220 will be described in brief with reference to FIG. 3.

Figure 3:
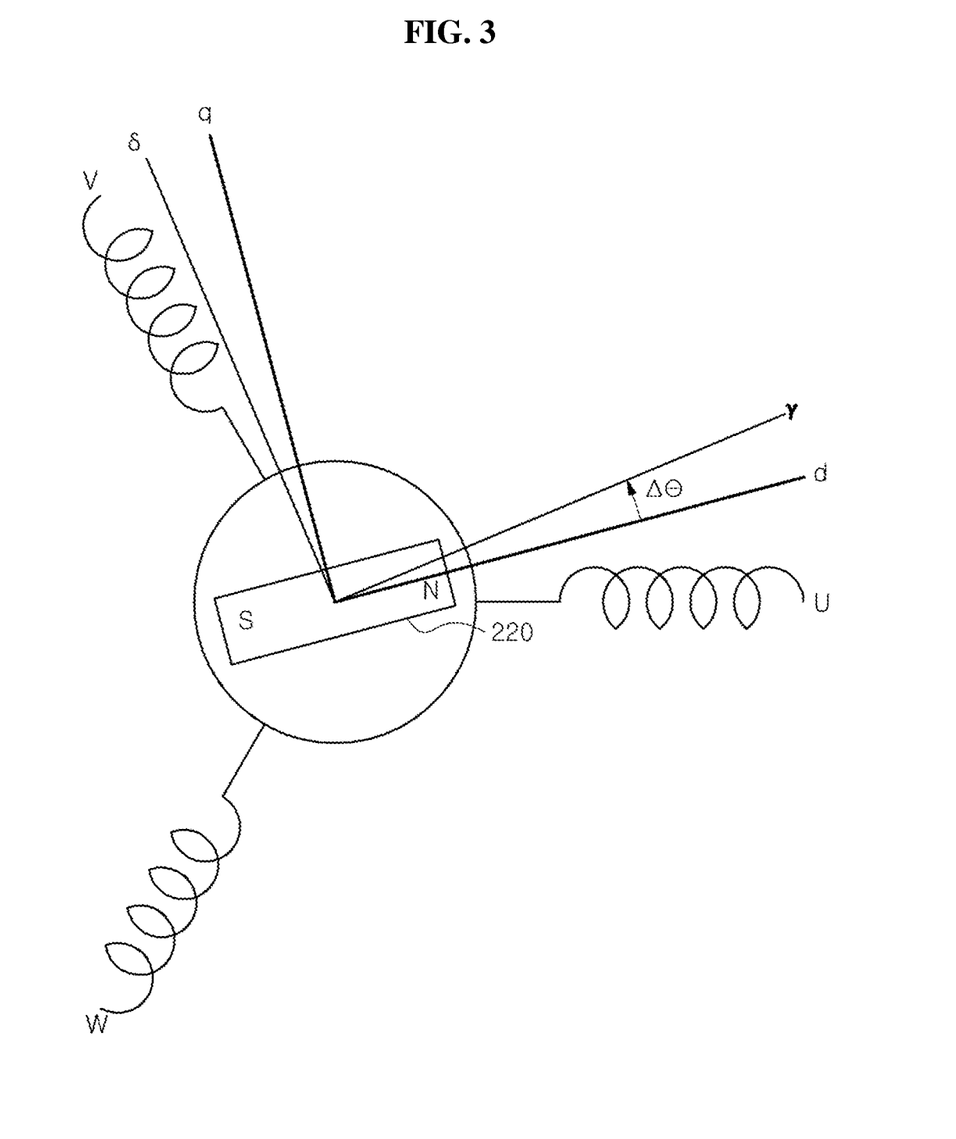
FIG. 3 is a view showing a coordinate system of a rotor.

Referring to FIG. 3, the coordinate system of the rotor 220 is provided with the synchronous rotation coordinate system composed of the d-q axes and the estimated coordinate system composed of the γ-δ axes.

For the synchronous rotation coordinate system, the d-axis refers to the position in the direction of magnetic flux of the rotor 220, and the q-axis is an axis proceeding in a rotation direction from the d-axis by 90 degrees.

For the estimated coordinate system, the γ-axis refers to the position of a virtual rotor, and a δ-axis is an axis proceeding in a rotating direction from the γ-axis by 90 degrees.

Then, the position error between the d-q axes of the synchronous rotation coordinate system and the γ-δ axes of the estimated coordinate system is defined as Δθ (in degrees or radians). The sensorless control apparatus in accordance with some example embodiments of the present disclosure is configured to control the electric motor 200 so that the position error Δθ may be about 0.

Meanwhile, assuming that the position error Δθ is sufficiently small, the mathematical formula 1 above may be expressed as in mathematical formula 2 below:

[Mathematical Formula 2]

$$\begin{bmatrix} V_\gamma \\ V_\delta \end{bmatrix} = \begin{bmatrix} R_s + \rho L_d & -\omega L_q \\ \omega L_d & R_s + \rho L_q \end{bmatrix} \cdot \begin{bmatrix} i_\gamma \\ i_\delta \end{bmatrix} + e \cdot \begin{bmatrix} -\sin\Delta\theta \\ \cos\Delta\theta \end{bmatrix}$$

Here, $V_\gamma$ and $V_\delta$ refer to the voltage values of the γ-axis and the δ-axis on the estimated coordinate system of the rotor, respectively. $i_\gamma$ and $i_\delta$ refer to the current values of the γ-axis and the δ-axis on the estimated coordinate system of the rotor. e refers to a counter-electromotive force that is generated as the rotor is rotated.

Meanwhile, in a digital system, the mathematical formula 2 above may be expressed as in a differential equation shown in mathematical formula 3 below:

[Mathematical Formula 3]

$$\begin{bmatrix} i_\gamma(n) \\ i_\delta(n) \end{bmatrix} = \begin{bmatrix} 1 - \frac{R_s}{L_d}Ts & \omega\frac{L_q}{L_d}Ts \\ -\omega\frac{L_d}{L_q}Ts & 1 - \frac{R_s}{L_q}Ts \end{bmatrix} \cdot \begin{bmatrix} i_\gamma(n-1) \\ i_\delta(n-1) \end{bmatrix} +$$

$$\frac{Ts}{L_d L_q}\begin{bmatrix} L_q V_\gamma(n-1) \\ L_d V_\delta(n-1) \end{bmatrix} + \frac{Ts}{L_d L_q} \cdot e \cdot \begin{bmatrix} L_q \sin\Delta\theta \\ -L_d \cos\Delta\theta \end{bmatrix}$$

Here, $i_\gamma(n)$ and $i_\delta(n)$ refer to the current values each measured in a n-step, respectively. $i_\gamma(n-1)$ and $i_\delta(n-1)$ refer to the current values of each measured in a n−1 step, respectively. $V_\gamma(n-1)$ and $V_\delta(n-1)$ refer to the voltage values of the γ-axis and the δ-axis each measured in a n−1 step, respectively. Ts refers to a sampling period.

Meanwhile, in a case when γ-δ axes, which are assumed as the position of the rotor, is in match with the d-q axes, which correspond to the actual synchronous rotation coordinate system, a condition that the position error Δθ=0 and the counter-electromotive force $e=\omega\lambda_f$ is satisfied, and thus a differential equation may be obtained as in the mathematical formula 4:

[Mathematical Formula 4]

$$\begin{bmatrix} i_{\gamma M}(n) \\ i_{\delta M}(n) \end{bmatrix} = \begin{bmatrix} 1 - \frac{R_s}{L_d}Ts & \omega\frac{L_q}{L_d}Ts \\ -\omega\frac{L_d}{L_q}Ts & 1 - \frac{R_s}{L_q}Ts \end{bmatrix} \cdot \begin{bmatrix} i_\gamma(n-1) \\ i_\delta(n-1) \end{bmatrix} +$$

$$\frac{Ts}{L_d L_q}\begin{bmatrix} L_q V_\gamma(n-1) \\ L_d V_\delta(n-1) \end{bmatrix} + \frac{Ts}{L_d L_q} \cdot \hat{e} \cdot \begin{bmatrix} 0 \\ -L_d \end{bmatrix}$$

According to the mathematical formula 4, the current values $i_{\gamma M}(n)$ and $i_{\delta M}(n)$ of the γ-axis and the δ-axis in the n step may be estimated by using the values $i_\gamma(n-1)$, $i_\delta(n-1)$, $V_\gamma(n-1)$ and $V_\delta(n-1)$ measured in the n−1 step.

Assuming that the position error Δθ is sufficiently small, the difference between the mathematical formula 3 and the mathematical formula 4 may be expressed in an approximated manner as in mathematical formula 5 below:

[Mathematical Formula 5]

$$\begin{bmatrix} \Delta i_\gamma \\ V i_\delta \end{bmatrix} = \frac{Ts}{L_d L_q}\begin{bmatrix} L_q \cdot e \cdot \sin\Delta\theta \\ L_d \cdot (\hat{e} - e \cdot \cos\Delta\theta) \end{bmatrix} \cong \frac{Ts}{L_d L_q} + \begin{bmatrix} L_q \cdot e \cdot \Delta\theta \\ -L_d \cdot (e - \hat{e}) \end{bmatrix}$$

Here, $\Delta i_\gamma$ represents a current error of the γ-axis, that is, the error between the estimated value and the measured value of the γ-axis current. $\Delta i_\delta$ represents a current error of the δ-axis, that is, the error between the estimated value and the measured value of the δ-axis current. According to the mathematical formula 5, the current error $\Delta i_\gamma$ of the γ-axis is in proportion to the position error Δθ, and the current error $\Delta i_\delta$ of the δ-axis is in proportion to the error (e−ê) of the counter-electromotive force.

Referring again to FIG. 1, the rotor angle estimation unit 370 may generate an estimated position ($\hat{\theta}_M$) and an estimated speed ($\hat{\omega}_M$) of the rotor as described above. However, the generating of the estimated position and speed as such is an example, and other sensorless control algorithms may be applied in generating the estimated position and speed. The position of the rotor estimated by the rotor angle estimation unit 370, that is, an angle ($\hat{\theta}_M$) of the rotor is provided to the out-of-step sensing unit 390.

Meanwhile, the rotor angle calculation unit 380 may calculate the magnetic flux of the rotor 220 based on the voltage equation on the stationary coordinate system. The voltage equation on the stationary coordinate system of the permanent synchronous electric motor is expressed as in mathematical formula 6 below:

[Mathematical Formula 6]

$$V_{dqs}^s = R_s \cdot \vec{i}_{dqs}^s + \frac{d}{dt}\lambda_{dqs}^s$$

In the mathematical formula 6, $V_{dqs}^s$ refers to both of the d-axis voltage and the q-axis voltage on the stationary coordinate system. $i_{dqs}^s$ refers to both of the d-axis current and the q-axis current on the stationary coordinate system. $\lambda_{dqs}^s$ refers to both of the d-axis magnetic flux and the q-axis magnetic flux on the stationary coordinate system. Hereinafter, a superscript 'e' represents the rotation coordinate system and a superscript 's' represents the stationary coordinate system. A subscript 's' arranged at the last represents a stator (e.g., 'dqs').

The mathematical formula 6 is expressed as in mathematical formula 7 regarding the magnetic flux below.

$$\lambda_{dqs}^s = \int(V_{dqs}^s - R_s \cdot i_{dqs}^s) \qquad \text{[Mathematical Formula 7]}$$

The rotor angle calculation unit 380 calculates the magnetic flux ($\lambda_{dqs}^s$) of the rotor 220 by use of the mathematical formula 7.

Thereafter, the rotor angle calculation unit 380 calculates an angle ($\theta_\lambda$) of the rotor from the calculated magnetic flux ($\lambda_{dqs}^s$). The angle ($\theta_\lambda$) of the rotor is calculated from the magnetic flux ($\lambda_{dqs}^s$) through mathematical formula 8 below.

[Mathematical Formula 8]

$$\theta_\lambda = \tan^{-1}\left(\frac{\lambda_{qs}^s}{\lambda_{ds}^s}\right)$$

In the mathematical formula 8, $\lambda_{qs}^s$ refers to the q-axis magnetic flux, and $\lambda_{ds}^s$ refers to the d-axis magnetic flux. The angle ($\theta_\lambda$) of the rotor calculated by the rotor angle calculation unit 380 is provided to the out-of-step sensing unit 390.

The out-of-step sensing unit 390 compares the angle ($\theta_\lambda$) of the rotor calculated by the rotor angle calculation unit 380 with the angle ($\hat{\theta}_M$) of the rotor estimated by the rotor angle estimation unit 370, and if the difference between the calculated angle of the rotor and the estimated angle of the rotor is not a constant value, the out-of-step sensing unit 390 determines that an out-of-step takes place. Hereinafter, the sensing of the out-of-step will be described in detail with reference to FIGS. 4 to 6.

Figure 4:
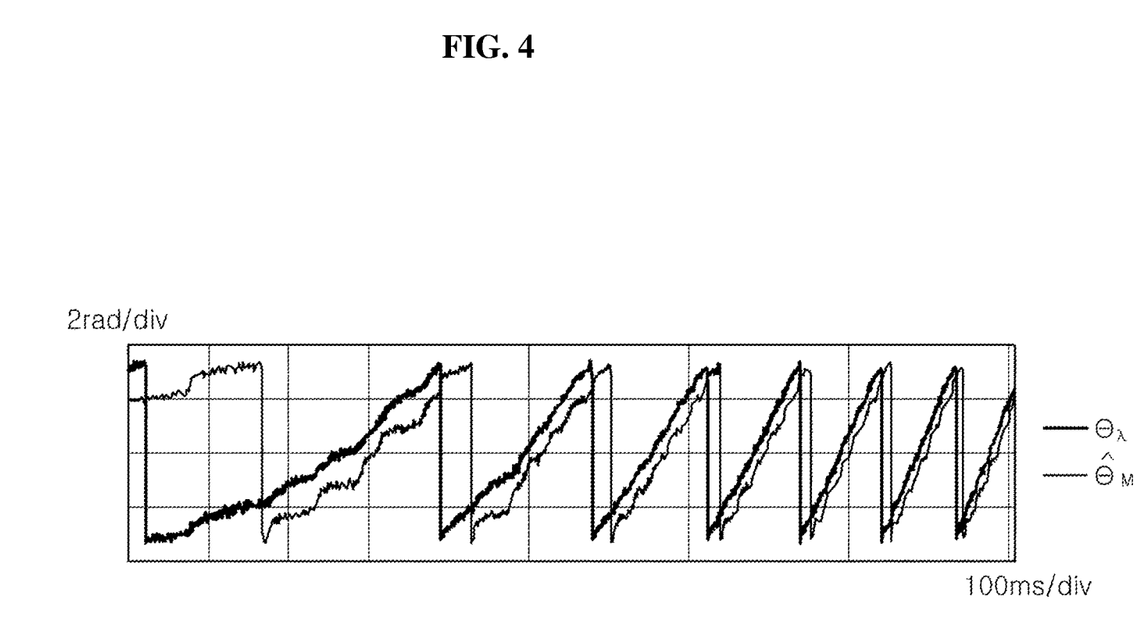
FIG. 4 is a graph showing an angle of a rotor estimated based on a sensorless algorithm and an angle of a rotor calculated using a voltage equation, in a case that an out-of-step does not take place.
Figure 5:
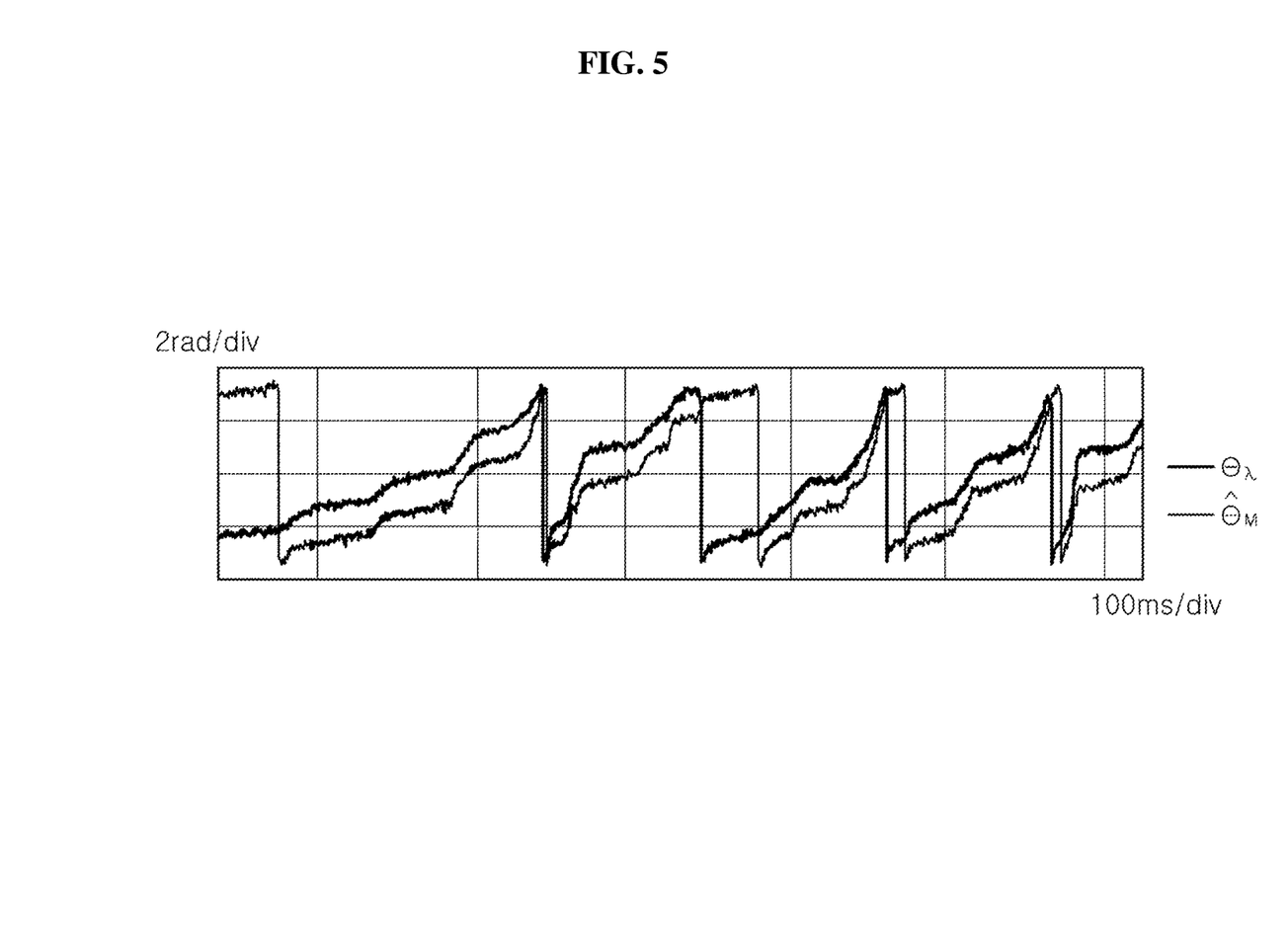
FIG. 5 is a graph showing an angle of a rotor estimated based on a sensorless algorithm and an angle of a rotor calculated using a voltage equation, in a case that an out-of-step takes place.

FIGS. 4 and 5 are graphs showing the change in the angle of the rotor according to time. FIG. 4 is a graph showing an angle ($\theta_\lambda$) of the rotor calculated based on the magnetic flux and an angle ($\hat{\theta}_M$) of the rotor estimated based on a sensorless algorithm, in a case that an out-of-step does not take place. FIG. 5 is a graph showing an angle ($\theta_\lambda$) of the rotor calculated based on the magnetic flux and an angle ($\hat{\theta}_M$) of the rotor estimated based on a sensorless algorithm, in a case that an out-of-step takes place.

Referring to FIG. 4 in a case that an out-of-step does not take place, the difference between the two angles of the rotor is maintained at a constant value. Referring to FIG. 5 in a case that an out-of-step takes place, the difference between the two angles of the rotor varies according to time.

Figure 6:
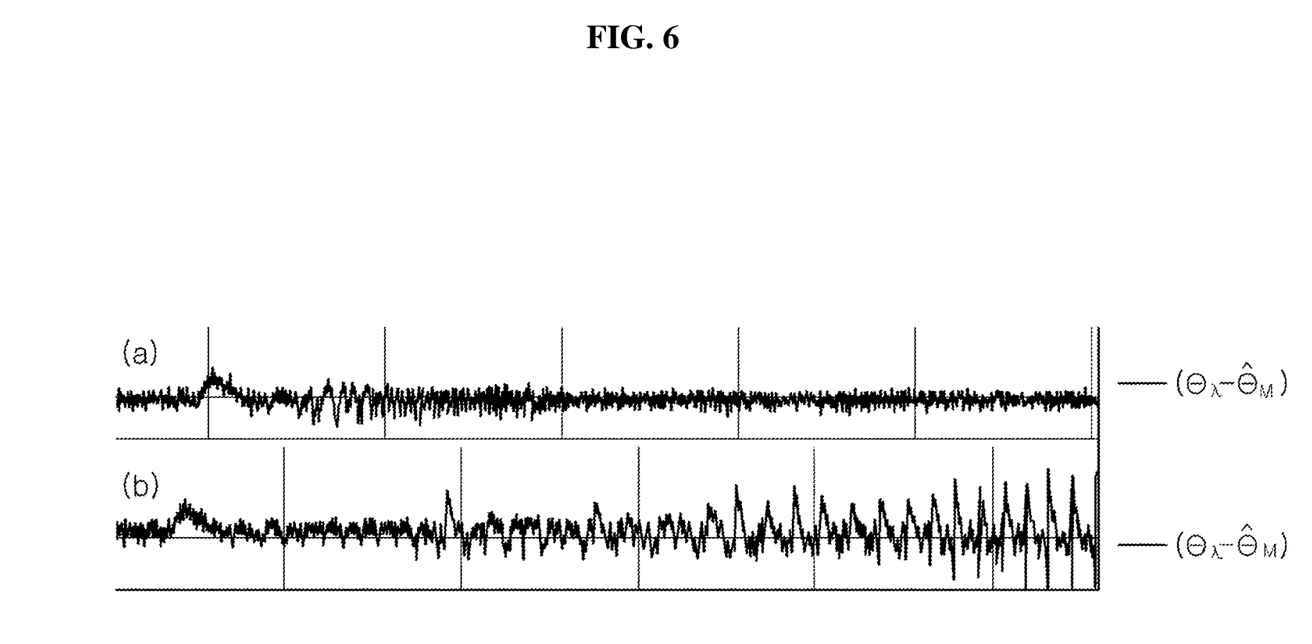
FIG. 6 is a graph showing the difference between an angle of a rotor estimated based on a sensorless algorithm and an angle of a rotor calculated using a voltage equation.

In FIG. 6, (a) represents the difference between two angles of the rotor in a case where an out-of-step does not take place, and (b) represents the difference between two angles of the rotor in a case where an out-of-step takes place. Referring to (a) of FIG. 6, in a case where an out-of-step does not take place, the difference between the two angles of the rotors is shown to be maintained at a constant value according to time. In contrast, referring to (b) of FIG. 6, in a case where an out-of-step takes place, the difference between the two angles of the rotors is shown to vary according to time.

As such, the out-of-step sensing unit 390 compares the two angles of the rotor, and senses the out-of-step depending on whether the difference between the two angles of the rotor is maintained at a constant value or not. In this case, the difference between the two angles of the rotor is not limited. That is, regardless of that the degrees of the difference between the two angles of the rotor are larger or small, if the difference of the two angles of the rotor is maintained at a constant value, the out-of-step sensing unit 390 determines that an out-of-step does not take place.

Hereinafter, the following description will be made in relation to a theory that explains the difference between the two angles of the rotor produced when the out-of-step occurs.

In the above mathematical formula 8, $\lambda_{ds}^s, \lambda_{qs}^s$ represents the stationary coordinate system, and has a significantly complicated explanation in theory. Accordingly, the voltage equation of the mathematical formula 1 expressing a model of an electric motor is provided on the synchronous rotation coordinate system as in the mathematical formula 9 below.

[Mathematical Formula 9]

$$V_{ds}^e = R_s i_{ds}^e - \omega_r L_q i_{qs}^e + L_d \frac{d}{dt} i_{ds}^e$$

$$V_{qs}^e = R_s i_{qs}^e - \omega_r (L_d i_{ds}^e + \lambda_f) + L_q \frac{d}{dt} i_{qs}^e$$

In a case that an out-of-step takes place and a rotation is not performed, different from a case a rotation is normally performed, a speed $\omega_r$ in the mathematical formula 9 becomes 0, thereby producing a voltage equation below:

[Mathematical Formula 10]

$$V_{ds}^e = R_s i_{ds}^e + L_d \frac{d}{dt} i_{ds}^e$$

$$V_{qs}^e = R_s i_{qs}^e + L_q \frac{d}{dt} i_{qs}^e$$

Accordingly, the voltage in a case that the rotor rotates in practice is different from the voltage in a case that the rotor does not rotate due to an out-of-step. As a result, the angle ($\theta_\lambda$) of the rotor calculated based on the voltage as such shows a difference from the angle ($\hat{\theta}_M$) of the rotor estimated by the rotor angle estimation unit 370.

Figure 7:
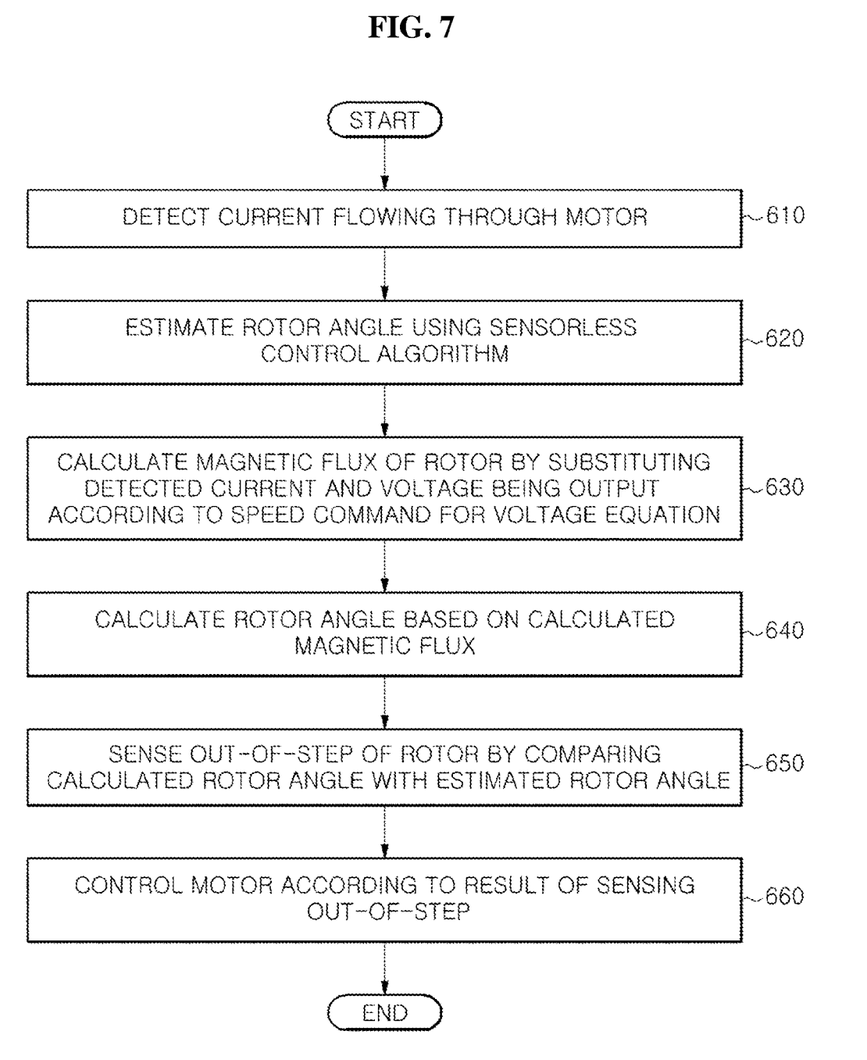
FIG. 7 is a flowchart showing a sensorless control method in accordance with some example embodiments of the present disclosure.

FIG. 7 is a flowchart showing a sensorless control method in accordance with some example embodiments of the present disclosure.

As a voltage being output from the inverter unit 120 according to the speed command of the speed command unit 300 is supplied to the electric motor 200, the current detector unit 350 detects currents flowing through the respective coils 211, 212, and 213 (610). The currents flowing the respective coils 211, 212, and 213 of the electric motor 200 are detected at an output end of the inverter unit 120 or between inverter unit 120 and electric motor 200. Operation 610 may include a process of detecting three-phase current, a process of converting the detected three-phase current into two-phase current, and/or a process of converting the stationary coordinate system of the two-phase current into the synchronous rotation coordinate system.

If the conversion of the synchronous rotation coordinate system is completed, the rotor angle estimation unit 370 estimates an angle of the rotor by use of a sensorless control algorithm (620). Examples of the sensorless control algorithm may include Matsui algorithm. The Matsui algorithm estimates the angle of the rotor by use of the detected currents $i_{ds}^e$ and $i_{qs}^e$ converted to the synchronous rotation coordinate system, and the voltages $V_{ds}^{e*}$ and $V_{qs}^{e*}$ being output on the synchronous rotation coordinate system.

Meanwhile, the rotor angle calculation unit 380 may calculate the magnetic flux of the rotor 220 based on a voltage equation (630). In this case, the rotor angle calculation unit) 380 may calculate the magnetic flux $\lambda_{qds}^s$ of the rotor by substituting the detected currents $i_{ds}^e$ and $i_{qs}^e$ converted to the synchronous rotation coordinate system and the voltages $V_{ds}^{e*}$ and $V_{qs}^{e*}$ on the synchronous rotation coordinate system for corresponding portions in the mathematical formula 7.

If the magnetic flux $\lambda_{qds}^s$ of the rotor is calculated, the rotor angle calculation unit 380 may calculate the angle of the rotor based on the calculated magnetic flux $\lambda_{qds}^s$ (640). In this case, the rotor angle calculation unit 380 may calculate the angle ($\theta_\lambda$) of the rotor by use of the mathematical formula 8.

Thereafter, the out-of-step sensing unit 390 senses the out-of-step by comparing the angle ($\hat{\theta}_M$) of the rotor estimated in operation 620 with the angle ($\theta_\lambda$) of the rotor calculated in operation 640 (650).

In detail, if a result of the comparison is determined that the difference between the two angles $\hat{\Theta}_M$ and $\theta_\lambda$ of the rotor is maintained at a constant value, the out-of-step sensing unit 390 determines that the rotor 220 normally rotates. In this case, the difference between the two angles of the rotor does not need to have a certain value. Only if the difference between the two angles of the rotor is maintained at a constant value, the rotor 220 is determined to normally operate.

If a result of the comparison is determined that the difference between the two angles $\hat{\theta}_M$ and $\theta_\lambda$ of the rotor continuously varies, the out-of-step sensing unit 390 determines that an out-of-step takes place.

The speed command unit 300 controls the electric motor 200 according to the result of sensing of the out-of-step sensing unit 390 (660). In detail, if the out-of-step sensing unit 390 does not sense an out-of-step, the speed command unit 300 generates a control signal to turn on/off the switching device of the inverter unit 120. If the out-of-step sensing unit 390 senses an out-of-step, the speed command unit 300 generates a control signal to stop the operation of the electric motor 200 or a control signal to decelerate the electric motor 200, and transmits the generated control signal to the switching device of inverter unit 120.

Some example embodiments of the present disclosure have been shown and described. With respect to some example embodiments described above, some components composing the sensorless control apparatus can be embodied as a type of 'module'. 'Module' may refer to software components or hardware components such as Field Programmable Gate Array (FPGA) or Application Specific Integrated Circuit (ASIC), and conducts a certain function. However, the module is limited to software or hardware. The module may be composed as being provided in a storage medium that is available to be addressed, or may be composed to execute one or more processor.

Examples of the module may include an object oriented software components, class components and task components, processes, functions, attributes, procedures, subroutines, segments of a program code, drivers, firmwares, microcode, circuit, data, database, data structures, tables, arrays, and variables. The functions provided by the components and the modules are incorporated into a smaller number of components and modules, or divided among additional components and modules. In addition, the components and modules as such may execute one or more central processing units (CPUs) in a device.

Some example embodiments of the present disclosure can also be embodied as computer readable medium including computer readable codes/commands to control at least one component of the above described example embodiments. The medium is any medium that can store and/or transmit the computer readable code.

The computer readable code may be recorded on the medium as well as being transmitted through internet, and examples of the medium include read-only memory (ROM), random-access memory (RAM), compact disc (CD)-ROMs, magnetic tapes, floppy disks, optical data storage devices, and carrier waves such as data transmission through the Internet. The medium may be a non-transitory computer readable medium. The medium can also be distributed over network coupled computer systems so that the computer readable code is stored and executed in a distributed fashion. In addition, examples of the component to be processed may include a processor or a computer process. The element to be processed may be distributed and/or included in one device.

While example embodiments have been particularly shown and described, it will be understood by those of ordinary skill in the art that various changes in form and details may be made therein without departing from the spirit and scope of the present invention as defined by the following claims.

What is claimed is:

1. A sensorless control apparatus, comprising:
a speed command unit configured to output a speed command to an electric motor;
a current detector unit configured to detect electric current flowing through the electric motor if a voltage being output according to the speed command is supplied to the electric motor;
a rotor angle calculation unit configured to calculate a magnetic flux of a rotor of the electric motor based on the detected electric current and the voltage being output according to the speed command, and to calculate an angle of the rotor from the calculated magnetic flux; and
an out-of-step sensing unit configured to sense an out-of-step of the rotor according to a comparison of the calculated angle of the rotor with an angle of the rotor estimated based on a sensorless control algorithm.

2. The sensorless control apparatus of claim 1, further comprising:
a first converter configured to convert calculated two-phase voltage commands, corresponding to the speed command, into three-phase voltages, corresponding to the speed command.

3. The sensorless control apparatus of claim 1, further comprising:
a first coordinate system conversion unit configured to convert calculated magnetic flux and torque commands, corresponding to the speed command, on a synchronous rotation coordinate system of the electric motor into calculated magnetic flux and torque commands, corresponding to the speed command, on a stationary coordinate system of the electric motor.

4. The sensorless control apparatus of claim 1, further comprising:
a second coordinate system conversion unit configured to convert calculated magnetic flux and torque commands, corresponding to the speed command, on a stationary coordinate system of the electric motor into voltages, corresponding to the speed command, on the stationary coordinate system of the electric motor.

5. The sensorless control apparatus of claim 1, further comprising:
a first coordinate system conversion unit configured to convert calculated magnetic flux and torque commands, corresponding to the speed command, on a synchronous rotation coordinate system of the electric motor into calculated magnetic flux and torque commands, corresponding to the speed command, on a stationary coordinate system of the electric motor; and
a second coordinate system conversion unit configured to convert the calculated magnetic flux and torque commands, corresponding to the speed command, on the stationary coordinate system of the electric motor into voltages, corresponding to the speed command, on the stationary coordinate system of the electric motor.

6. The sensorless control apparatus of claim 1, further comprising:
a second converter configured to convert three-phase currents detected in coils of the electric motor into two-phase currents corresponding to the three-phase currents.

7. The sensorless control apparatus of claim 1, further comprising:
a third coordinate system conversion unit configured to convert currents detected in coils of the electric motor into currents in a stationary coordinate system of the electric motor, corresponding to the currents detected in the coils of the electric motor.

8. The sensorless control apparatus of claim 1, further comprising:
a fourth coordinate system conversion unit configured to convert currents in a stationary coordinate system of the electric motor, corresponding to currents detected in coils of the electric motor, into currents in a synchronous rotation coordinate system of the electric motor, corresponding to the currents detected in the coils of the electric motor.

9. The sensorless control apparatus of claim 1, further comprising:
a third coordinate system conversion unit configured to convert currents detected in coils of the electric motor into currents in a stationary coordinate system of the electric motor, corresponding to the currents detected in the coils of the electric motor; and
a fourth coordinate system conversion unit configured to convert the currents in the stationary coordinate system of the electric motor, corresponding to the currents detected in coils of the electric motor, into currents in a synchronous rotation coordinate system of the electric motor, corresponding to the currents detected in the coils of the electric motor.

10. The sensorless control apparatus of claim 1, wherein the rotor angle calculation unit is configured to calculate the magnetic flux of the rotor by use of a voltage equation on a stationary coordinate system of the electric motor.

11. The sensorless control apparatus of claim 1, wherein the rotor angle calculation unit is configured to calculate the angle of the rotor by use of a d-axis magnetic flux and a q-axis magnetic flux on a stationary coordinate system of the electric motor.

12. The sensorless control apparatus of claim 1, wherein the out-of-step sensing unit is configured to determine that the rotor rotates in a normal state, if a difference between the calculated angle of the rotor and the estimated angle of the rotor maintains a constant value over time, and
wherein the out-of-step sensing unit is configured to determine that the rotor is in an out-of-step state, if the difference between the calculated angle of the rotor and the estimated angle of the rotor varies over time.

13. The sensorless control apparatus of claim 1, wherein the speed command unit is configured to control the electric motor according to a result of the sensing by the out-of-step sensing unit.

14. The sensorless control apparatus of claim 1, further comprising:
a rotor angle estimation unit configured to estimate the angle of the rotor based on the sensorless control algorithm;
wherein the out-of-step sensing unit is configured to sense the out-of-step of the rotor according to a result of comparison between the calculated angle of the rotor from the rotor angle calculation unit and the estimated angle of the rotor from the rotor angle estimation unit.

15. The sensorless control apparatus of claim 1, wherein an output of the out-of-step sensing unit is used as an input to the speed command unit.

16. The sensorless control apparatus of claim 1, wherein if the out-of-step sensing unit senses the out-of-step of the rotor, the speed command unit is configured to stop operation of the electric motor.

17. The sensorless control apparatus of claim 1, wherein if the out-of-step sensing unit senses the out-of-step of the rotor, the speed command unit is configured to decelerate the electric motor.

18. A sensorless control apparatus, comprising:
a speed command unit configured to output speed commands;
a speed control unit configured to output current commands that correspond to the speed commands;
a current control unit configured to output voltage commands that correspond to the current commands;
a converter configured to output three-phase voltages that correspond to the voltage commands;
a modulation unit configured to output a modulated signal, based on the three-phase voltages, to an inverter associated with an electric motor;
a rotor angle calculation unit configured to calculate an angle of a rotor of the electric motor;
a rotor angle estimation unit configured to estimate the angle of the rotor of the electric motor based on a sensorless control algorithm; and
an out-of-step sensing unit configured to sense out-of-step of the rotor of the electric motor according to a comparison of the calculated angle of the rotor with the estimated angle of the rotor.

19. The sensorless control apparatus of claim 18, further comprising:
a current detector unit configured to detect electric current flowing through coils of the electric motor.

20. A sensorless control apparatus, comprising:
a speed command unit configured to output speed commands;
a speed control unit configured to receive the speed commands and to convert the speed commands into current commands;
a current control unit configured to receive the current commands and to convert the current commands into voltage commands;
a converter configured to receive the voltage commands and to convert the voltage commands into three-phase voltages;
a modulation unit configured to receive the three-phase voltages and to output a modulated signal to an inverter associated with an electric motor;
a rotor angle calculation unit configured to calculate an angle of a rotor of the electric motor;
a rotor angle estimation unit configured to estimate the angle of the rotor of the electric motor based on a sensorless control algorithm; and
an out-of-step sensing unit configured to sense out-of-step of the rotor of the electric motor according to a comparison of the calculated angle of the rotor with the estimated angle of the rotor.

* * * * *